Figure 1:
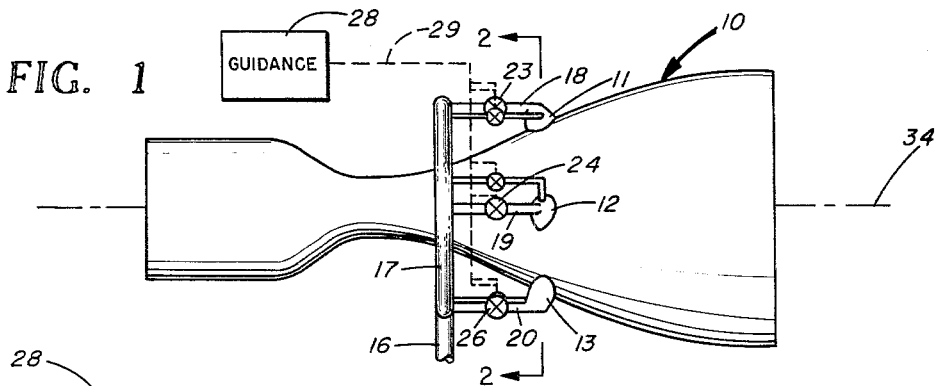

Jan. 18, 1966           B. A. JONES           3,229,461

FLUID AMPLIFICATION DEVICE FOR PROPULSION SYSTEM ROLL CONTROL

Filed May 4, 1965

Burton A. Jones
INVENTOR.

BY
ATTORNEY.

AGENT.

United States Patent Office 3,229,461
Patented Jan. 18, 1966

3,229,461
FLUID AMPLIFICATION DEVICE FOR PROPULSION SYSTEM ROLL CONTROL
Burton A. Jones, North Palm Beach, Fla., assignor, by mesne assignments, to the United States of America as represented by the Secretary of the Navy
Filed May 4, 1965, Ser. No. 453,895
3 Claims. (Cl. 60—35.54)

This invention relates to the art of propulsion systems for missiles, for example. More particularly, the invention relates to a secondary injection thrust vector control propulsion system having provision for roll control.

Known forms of secondary injection thrust vector control do not have the capability of providing roll control, another and separate system normally being depended upon for this purpose. In applicant's copending patent application Serial No. 453,894, filed May 4, 1965, a roll control scheme is described in which the secondary injection jet of a secondary injection thrust vector control system is deflected into a direction in which it does not intersect the axis of the primary thrust nozzle, thus producing a rolling moment about that axis. The two embodiments described in that copending application, however, each require a separate compensation system since actuation of the roll control will result in a radial component as well as the tangential roll component of the secondary injection jet, as is mentioned in that application.

Accordingly, it is an object of this invention to provide a secondary injection thrust vector control and a roll control system of the general type described in the aforementioned copending patent application but which is provided with a simple and convenient means of compensating for the radial component of the roll control.

The purpose and object of the invention are achieved by providing, in a secondary injection thrust vector control system, pairs of oppositely disposed over-expanded injection nozzles. These nozzles are specially constructed so that the secondary injection jets issuing therefrom are normally directed to intersect the axis of the main thrust nozzle. A control is provided on each nozzle which when actuated forces the primary jet to the opposite wall of the over-expanded nozzle, resulting in a situation in which the jet is directed to a position which does not intersect with the axis of the main nozzle. The jet remains in the off-axis position until the control fluid is turned off at which time it reverts back to its original position. In this scheme, single secondary controls work in pairs on diametrically opposite units. In this manner, self-compensation is achieved since the radial components of the injection vectors are equal and opposite.

Figure 2:
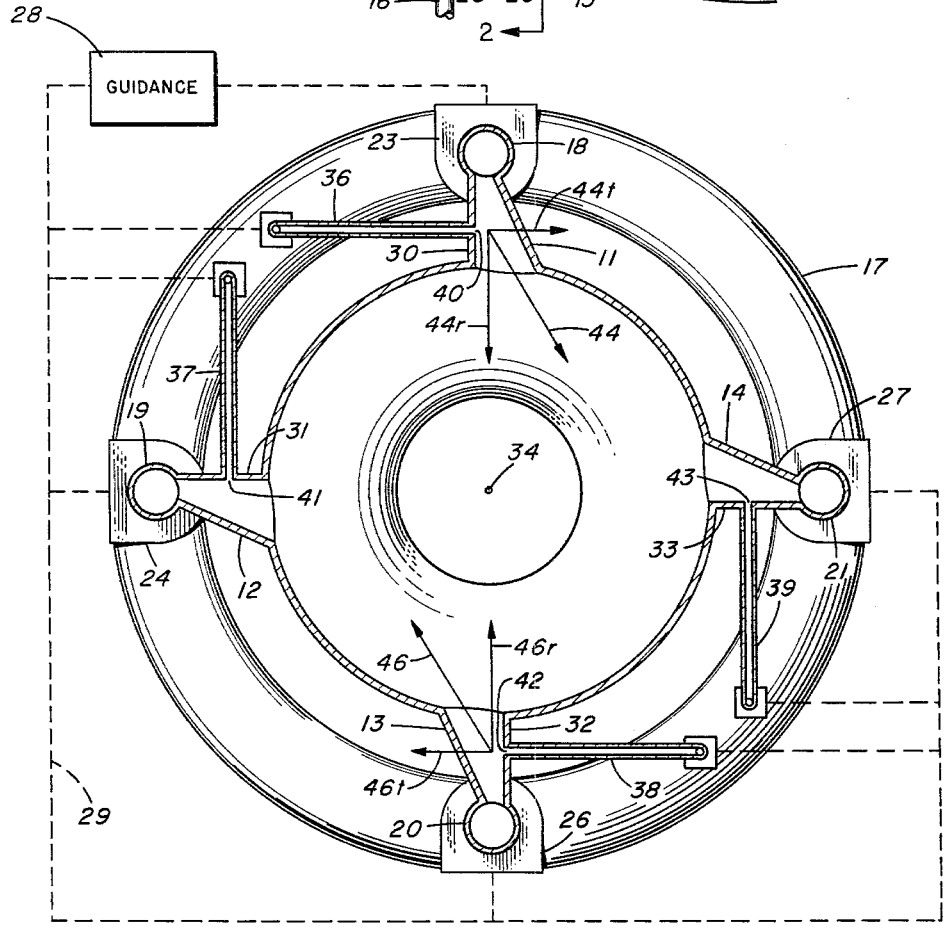

Other advantages, objects and new features will become apparent to those skilled in the art from a consideration of the following detailed description when read in conjunction with the accompanying drawing wherein:

FIG. 1 is a partially diagrammatic side view of a thrust nozzle incorporating the present invention; and FIG. 2 is a section on line 2—2 of FIG. 1.

Referring now to FIG. 1, the invention is there shown as applied to a diverging-converging nozzle 10 although it will be understood that the device according to the invention may be applied to any of the several different known types of propulsion nozzles.

Disposed around the periphery of the nozzle 10 in a plane generally indicated by the line 2—2 in FIG. 1 are a plurality of specially constructed secondary injection nozzles 11, 12, 13 and 14. Fluid under pressure is supplied to each of the secondary injection nozzles from a source of secondary fluid not shown through a conduit 16 and a header 17. Conduits 18, 19, 20 and 21 communicate between header 17 and the nozzles 11–14. Valves 23, 24, 26 and 27 in conduits 18, 19, 20 and 21, respectively, are responsive to the guidance system 28 through the connection 29 to supply fluid to the nozzles 11–14 for steering purposes.

Referring now to FIG. 2, the structure of each of the secondary injection nozzles will be described. Each of the nozzles 11–14 is provided with a diverging portion as shown which is over-expanded with respect to the pressure normally prevailing in nozzle 10 in the vicinity of the plane 2—2. The nozzles are arranged and oriented so that the undisturbed flow therefrom is along walls 30, 31, 32 and 33, respectively, of each of the nozzles. This orientation is also chosen such that the direction of the undisturbed jet issuing from each of the nozzles intersects the axis 34 of the main thrust nozzle, which in FIG. 2 would be directly upward out of the page.

Each of the nozzles 11 to 14 is provided with a means for deflecting the jet issuing therefrom to a direction such that it does not intersect the axis 34 of the main nozzle. To this end, each of the nozzles is provided with a valve controlled conduit, 36, 37, 38 and 39, respectively, communicating between the header 17 and the control ports 40, 41, 42 and 43, respectively, of nozzles 11–14. The valves in the conduits 36 to 39 are also responsive to signals from the guidance system 28 over line 29 to supply fluid under pressure to the control ports 40 to 43 for roll control purposes.

As is apparent from an inspection of FIG. 2, the roll control aspect of the present invention is the result of the orientation of the nozzles 11 to 14. It will be noted that nozzle 11 and nozzle 13 are arranged to work in concert to provide counterclockwise roll. To this end, nozzle 11 is oriented to the right in FIG. 2 and nozzle 13 is oriented to the left in complementary fashion. When it is desired to effect a counterclockwise movement of the nozzle, fluid is supplied through valve conduits 18 and 20 to nozzles 11 and 13, respectively, at equal volume rates. Control signals are also applied through conduits 36 and 38 to the nozzles. The control signals deflect the jets issuing from nozzles 11 and 13 toward the over-expanded sidewall thereof, thus resulting in injection jets as represented by the vectors 44 and 46.

The tangential components $44_t$ and $46_t$ provide a force couple which results in a rolling movement in the direction opposite from these vectors. It should now be clear that the system is self-compensating. Vectors $44_r$ and $46_r$, the radial components of the vectors 44 and 46 are equal and opposite. Thus, a pure rolling movement is possible without a computation in the guidance system of compensating injections.

Nozzles 12 and 14 are arranged and oriented to act in concert to provide clockwise roll in the same manner as nozzles 11 and 13 provide counterclockwise roll. A detailed discussion of the operation of nozzles 12 and 14 is therefore not deemed necessary.

It should be apparent from the above discussion that a simple and convenient, integrated secondary injection thrust vector control and roll control system has been provided. Certain modifications may occur to those skilled in the art from a consideration of this description and it is therefore to be understood that within the scope of the appended claims, the invention may be practiced otherwise than as herein specifically described.

What is claimed is:

1. A thrust vector and roll control system for a propulsion system having a thrust nozzle having an axis, comprising
 a plurality of secondary injection nozzles disposed around the periphery of said thrust nozzle, and arranged generally parallel to a plane normal to said thrust nozzle axis,
 at least one of said secondary injection nozzles having an inlet and a divergent portion which is overexpanded with respect to the pressure normally present in the vicinity of said plane when said thrust nozzle is in operation, said one secondary injection nozzle having the inlet and divergent portion thereof arranged and oriented so as to produce a jet of fluid which is normally attached to one wall of said divergent portion in a direction which intersects the thrust nozzle axis, and means selectively actuatable to deflect said jet away from said one wall into a direction, in said plane, which does not intersect said thrust axis, whereby a rolling moment about said thrust axis is produced.

2. A thrust vector and roll control system for a propulsion system having a thrust nozzle having an axis, comprising a plurality of secondary injection nozzles disposed around the periphery of said thrust nozzle in an arrangement which is generally parallel to a plane normal to said thrust nozzle axis, at least one of said secondary injection nozzles having an inlet and a divergent portion which is overexpanded with respect to the pressure normally present in the vicinity of said plane when said thrust nozzle is in operation, said one secondary injection nozzle having the inlet and divergent portion thereof arranged and oriented so as to produce a first jet of fluid which is normally attached to one wall of said divergent portion in a direction which intersects the thrust nozzle axis, means selectively actuatable to deflect said first jet away from said one wall into a direction, in said plane, which does not intersect said thrust axis, at least one other of said secondary injection nozzles having an inlet and overexpanded divergent portion arranged and oriented to produce a second jet of fluid normally in a direction intersecting said thrust axis, means selectively actuatable to deflect said second jet into a direction, in said plane, which does not intersect said thrust axis and which is in the opposite sense with respect to the deflection of said first jet, whereby both clockwise and counterclockwise rolling moments may be produced.

3. A thrust vector and roll control system for a propulsion system having a thrust nozzle having an axis, comprising four secondary injection nozzles disposed in uniformly spaced relation around the periphery of said thrust nozzle, arranged generally parallel to a plane normal to said thrust nozzle axis, means for selectively supplying fluid under pressure to said secondary injection nozzles, each of said secondary injection nozzles having an inlet and a divergent portion which is overexpanded with respect to the pressure normally present in the vicinity of said plane when said thrust nozzle is in operation, the inlets and divergent portions of said secondary injection nozzle being arranged and oriented so as to produce jets of fluid which are normally attached to one wall of each of said divergent portions and in directions which intersect the thrust nozzle axis, control means on each secondary injection nozzle selectively actuatable to deflect its jet away from the one wall thereof into a direction, in said plane, which does not intersect said thrust axis, one diametrically opposed pair of said secondary injection nozzles being oriented to produce, when actuated, a force couple providing a clockwise rolling moment about said thrust axis, the other diametrically opposed pair of secondary injection nozzles being oriented in the opposite sense to produce a counterclockwise rolling moment.

References Cited by the Examiner

UNITED STATES PATENTS

| 3,016,063 | 1/1962 | Hausmann | 137—81.5 |
| 3,121,312 | 2/1964 | Hopper | 60—35.54 |
| 3,122,165 | 2/1964 | Horton. | |
| 3,135,225 | 5/1964 | Pennington | 60—35.54 |
| 3,143,856 | 1/1964 | Hausmann | 60—35.54 |
| 3,166,897 | 7/1965 | Lawrence et al. | 60—35.54 |
| 3,204,405 | 9/1965 | Warren et al. | 60—35.54 |
| 3,206,928 | 9/1965 | Moore | 60—35.54 |

FOREIGN PATENTS

| 748,983 | 5/1956 | Great Britain. |

MARK NEWMAN, *Primary Examiner.*

A. L. SMITH, *Assistant Examiner.*